(12) United States Patent
Manohar et al.

(10) Patent No.: US 6,301,655 B1
(45) Date of Patent: Oct. 9, 2001

(54) EXCEPTION PROCESSING IN ASYNCHRONOUS PROCESSOR

(75) Inventors: Rajit Manohar, Ithaca, NY (US); Alain J. Martin; Mika Nystrom, both of Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/153,756

(22) Filed: Sep. 15, 1998

Related U.S. Application Data
(60) Provisional application No. 60/058,995, filed on Sep. 15, 1997.

(51) Int. Cl.[7] ............................................. G06F 9/00
(52) U.S. Cl. ................................................... 712/244
(58) Field of Search ................... 712/4, 18, 20, 712/21, 22, 25, 41, 201, 225, 244, 246

(56) References Cited

U.S. PATENT DOCUMENTS 5,553,276 * 9/1996 Dean ..................................... 713/500
5,752,070 * 5/1998 Martin et al. ........................ 712/33

OTHER PUBLICATIONS

Richardson, W.F., et al., "Precise exception handling for a self–timed processor", 10/95. pp. 32–37.*

Furber, S.B., "Amulet1: a micropipelined ARM", 2–94. pp. 476–485.*

* cited by examiner

Primary Examiner—John F. Niebling
Assistant Examiner—Stacy Whitmore
(74) Attorney, Agent, or Firm—Fish & Richardson P.C.

(57) ABSTRACT

Exception handling systems and techniques for handling exceptions and sequencing conflicts in an asynchronous processor. Two designated queues are used to respectively keep program counter values of instructions and the assignments of the execution units for executing the instructions according to the program order. An asynchronous circuit is coupled between the program counter unit and the writeback unit of the processor to provide asynchronous communications.

9 Claims, 2 Drawing Sheets

EXCEPTION PROCESSING IN ASYNCHRONOUS PROCESSOR

This application claims the benefit of the U.S. Provisional Application No. 60/058,995, filed on Sep. 15, 1997, which is incorporated herein by reference.

This invention was made with the support of the United States Government pursuant to Army Contract No. DAAH04-94-G-0274.

This disclosure relates to the processing of exceptions in asynchronous data processors. Such processors can be used in many different items, including calculators, microcontrollers, microprocessors, digital signal processors, CPU cores for a microcomputer, minicomputer and large-scale computers generally.

BACKGROUND

Asynchronous processors do not use a clock to implement the operating of different operations. One of those operations includes the execution of the instructions of the processor.

The potential advantages of asynchronous and in particular quasi-delay-insensitive implementations of data processors have been described in the prior art. See for instance U.S. Pat. No. 5,752,070 to Martin and Barnes, and other U.S. patent applications by the present inventor.

This application relates more specifically to the case when the processor is pipelined. Pipelining is a standard technique in modern processor architecture and is well described in the literature. For instance, the standard computer architecture text by Hennessy and Paterson describes pipelining in great detail. Pipelining is an implementation technique whereby multiple instructions are simultaneously overlapped in execution. Today, pipelining is the key implementation technique to make CPUs.

A pipeline is like an assembly line: Each step in the pipeline completes a part of the instructions. As in a car assembly line, the work to be done is an instruction is broken down into small pieces, each of which takes a fraction of the time needed to complete the entire instruction. Each of these steps is called a pipeline stage.

In an asynchronous process, a pipeline stage communicates with other stages by exchanging messages. Typically, a stage receives data from a plurality of stages; it then processes the data, and sends the results to a plurality of stages. Each stage proceeds at its own speed. The communication between stages (send and relaying) synchronizes the activities of the different stages.

In a traditional, clocked pipelined processor, the number of instructions in execution in the pipeline is fixed in normal operation. In an asynchronous pipeline, because each stage proceeds at its own speed, the number of instructions in execution is variable. This difference is very important when it comes to dealing with "exceptions".

An exception, also called "interrupt", is a hardware and/or software mechanism that makes it possible to interrupt the normal execution of instructions when an exceptional event occurs that requires immediate processing. Such an event is usually an arithmetic error, or a real-time event, or an I/O. Modern exception mechanisms are used for other purposes like training instruction execution, operating system calls, page fault, memory and protection isolation, undefined instructions, protection isolations, hardware malfunction, power failure, etc.

The handling of an exception has a number of steps. (1) the exception is detected, (2) the necessary information relative to the exception is saved into some registers, in particular the program counter value of the instruction that caused the exception, and the nature of the exception, and (3) the program counter is assigned the address of the first instruction of an exception handling routine.

In the case where the processor is pipelined, several instructions may already be in execution when the exception occurs. In that case, all instructions already in execution in the pipeline have to be canceled. The exception mechanism is said to implement precise exceptions when the state of the execution saved for the exception handling routine is the same as the state of the processor before execution of the instruction that caused the exception. As a result, after the exception handler has finished, the execution of the program can be restarted from the point where the exception occurred, without affecting the program behavior.

In a clocked pipeline, all stages are controlled by the same global time reference. When an exception occurs, it is relatively straightforward to take a "snapshot" of the state of the pipeline. In particular, the number of instructions in the pipeline is fixed, and it is therefore straightforward to cancel all instructions in the pipeline.

In an asynchronous pipeline, there is no global clock. The number of instructions in the pipeline is variable. Hence, implementing precise exceptions is more difficult.

SUMMARY OF THE INVENTION

The present disclosure includes a new system and method to effectively handle exceptions in an asynchronous processor.

According to one embodiment of the invention, in an asynchronous pipeline, an instruction interrupted by an exception detected in an execution unit and all the instructions that follow it before the first exception handler instruction do not change the state of the processor (this is known as having precise exceptions). These instructions are prevented from modifying the state of the processor—the general purpose registers, special purpose registers, and data memory—by the use of a special "write-back" process. The write-back process interrupts the normal program-counter execution by requesting that the exception handler be executed. In addition, the write-back saves information about the exception (the cause of the exception, the program counter of the exception instruction, etc.) in special processor registers. Normal execution is resumed when the first instruction of the exception handler is executed.

One aspect for exception handling is the way the program order of the instructions is determined by the write-back process. The write-back process needs information about the order in which the instructions occurred in the program so that it can determine which instructions to cancel, and which instruction caused the first exception. This sequence would normally be lost in an asynchronous processor when the decode distributes the instructions to different execution units. To preserve this order, the decode also maintains a queue of execution unit numbers which correspond to the order in which the execution units were sent instructions. Each execution unit preserves the order of instructions sent to it, and therefore the write-back can reconstruct the program order using this queue.

Once the write-back determines an exception has occurred, it cancels the result of the instruction and subsequent instructions until the first instruction of the exception handler is executed. Each instruction has a special bit associated with it, called the "valid-again" bit. This bit is normally false. When an exception is encountered, the "pcunit" generates a special pseudo-instruction that has the valid-again bit set. The instruction following this pseudo-instruction is the first instruction of the exception handler. When the write-back receives an instruction with the valid-again bit set, it reverts back to normal operation and permits instructions that follow it to modify the state of the processor. The pseudo-instruction is also responsible for updating the special register used to store exception information.

According to another embodiment of the invention, the precise exception mechanism can be used to unpipeline the processor and thus resolve sequencing problems ("data hazards") on infrequently executed instructions. To support this mechanism, the write-back stalls the pcunit until the valid-again instruction arrives. The special pseudo-instruction is therefore executed without any other instructions running in parallel with it. When a potential sequencing problem is detected, the instruction causing the conflict is made to raise an exception and is saved in a special register. The pseudo-instruction then executes the saved instruction. In this case, the pcunit resumes execution at the next program counter, instead of at the address of the exception handler.

According to another embodiment, the precise exception mechanism can be used to handle speculative execution in an asynchronous architecture. When instructions are executed speculatively, the write-back mechanism can be used to prevent these instructions from modifying the state of the processor if it is determined that these instructions were not supposed to be executed. In this case, the write-back will not report an exception but simply prevent the speculative instructions from modifying the state of the processor.

BRIEF DESCRIPTION OF THE DRAWING

These and other aspects of the invention will now be described with reference to the attached drawings, in which.

DETAILED DESCRIPTION

The present preferred embodiment is the description of an asynchronous implementation of the MIPS instruction set architecture. The specific operations as described herein allow processing and handling of exceptions in the context of the MIPS instruction set architecture.

The processor executes instructions by using a program counter to determine which instruction to execute. This program counter is used to retrieve instructions from the instruction memory. The retrieved instruction is then decoded and executed by the processor. When the processor attempts to execute an instruction which cannot be completed because some error occurred while executing it, the processor raises an exception. Examples of such exception conditions include attempting to execute an illegal instruction, an overflow on an arithmetic operation, a failure during a memory operation caused by data corruption or by an address translation failure, etc.

When an exception occurs, the processor is required to interrupt the normal flow of execution and jump to one of a fixed set of addresses known as the exception handler addresses. In addition, the processor is required to modify certain registers, record the cause of the exception, and the program counter value of the exception-causing instruction. Once the processor jumps to the exception handler address, it can resume normal execution. A processor is said to implement precise exception when the processor state seen by the first instruction of the exception handler is the state of the processor before the exception-causing instruction was executed (apart from the modifications to the special registered mentioned earlier). Having precise exceptions permits the software exception handler to determine precisely what caused the exception, take corrective measures, if any, and possibly resume execution of the interrupted sequence of instructions.

The implementation of precise exceptions is difficult when the processor is highly pipelined, and also when the processor is asynchronous. In a pipelined processor, multiple instructions might be in differing stages of execution. When an exception occurs during the execution of a particular instruction, instructions that follow the exception-causing instruction might have been partially executed.

An asynchronous processor cannot determine when it has finished executing other instructions in the execution pipeline by counting clock cycles (as a synchronous processor can), since there is no clock. Instead, additional mechanisms are necessary to determine when the instructions that are present in the pipeline have completed execution.

Figure 1:
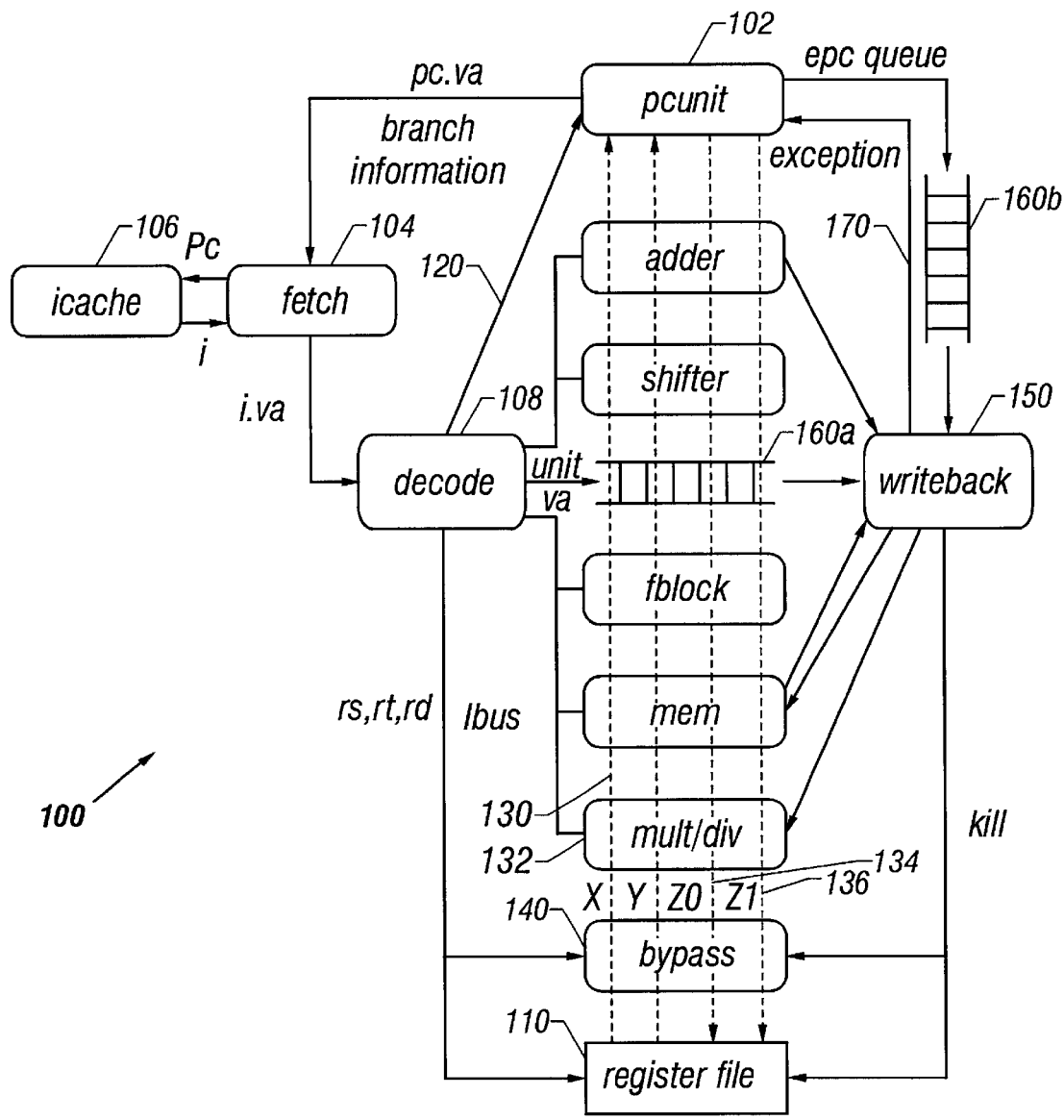
FIG. 1 shows a basic block diagram of an asynchronous processor.

A block diagram of the preferred system forming the present invention is shown in FIG. 1. The structure is conceptually formed of a plurality of processes. Each of the processes is carried out in hardware. There is no clock to synchronize the different processes; instead synchronization is performed by communications among the processes as described in U.S. Pat. No. 5,752,070, to Martin et al., The disclosure of which is hereby incorporated by reference.

A pcunit process 102 is responsible for determining the value of the program counter to be used for the next instruction. The pcunit process 102 also stores a copy of the sequence of program counter values in the epc queue 160b for the purposes of exception processing.

The fetch process 104 receives this program counter from the pcunit 102, performs any necessary address translation specified by the instruction set architecture, and uses the translated address to retrieve the next instruction from the instruction memory process icache 106. The task of address translation can be complex and is well known to those having ordinary skill in the art. The icache 106 handles requests to off-chip memory, and returns the instruction to the fetch process 104. The output of the fetch process 104 is the next instruction to be executed.

The fetch process 104 outputs the instruction to the decode process 108.

The decode process 108 decodes the instruction, and sends various parts of the decoded information to different parts of the processor. The tasks performed by the decode 108 include selecting registers to be read and potentially modified by the instruction, selecting the execution unit appropriate for the type of instruction, and decoding branch information to be sent back to the pcunit 102 via the communication link 120. The decode 108 also sends appropriate information to the selected execution unit so that the execution unit can determine what instruction is to be executed next.

This procedure of decoding and dispatching instructions allows simultaneous use of a plurality of execution units. An execution unit is a generic term for many different possible variants including a unit that can execute load and store instructions for a memory, an arithmetic logic unit ALU, a shifter, a multiplier, a divider, and the like. Each execution unit carries out an operation based on the instruction it receives from the decode 108. The data values used by the execution unit come from the instruction (for immediate type instructions), or from the register file process 110 via the busses labeled X and Y in FIG. ~1, or both. The result of the operation is returned to the register file process 110 via the busses Z0 (134) and Z1 (136), and is eventually stored in a register in the register file process. The system in accordance with the invention may include one or a plurality of execution units, such as a first execution unit EU1, a second execution unit EU2, and the like up to execution unit EUN. There is essentially no fundamental limit on the number of execution units which can be used according to this teaching. Multiple execution units permit a plurality of instructions to be processed in parallel.

The block diagram of the preferred system shown in FIG. 1 has five execution units shown adder, shifter, fblock, mem, mult/div. This, however, is not a limitation and the number of execution units and/or their functionality can be easily changed by those having ordinary skill in the art.

The register file process 110 supplies data to the execution units, and receives values from the execution units. Writing of data from the execution units to the register file is controlled by a write-back process 150.

An exception can occur at various points in the execution of an instruction. However, all exceptions are detected at the execution units as understood in the art.

A specific problem occurs in such an execution unit when operating with an asynchronous processor as described in U.S. Pat. No. 5,752,070.

That asynchronous processor, like the one shown in FIG. 1, is a distributed system which has no clock to synchronize the different actions, making the task of determining what instructions are pending in different execution units more complex.

Once an exception is detected, the result of further instructions need to be prevented from modifying the state of the processor. This process must continue until the exception handler instructions begin execution. This entire process is controlled by the write-back process 150 in conjunction with the unit number queue 160a and epc queue 160b, and its interactions with the pcunit 102.

The decode 108 receives instructions in the order determined by the pcunit 102, which corresponds to the order in which instructions are intended to be executed as specified by the instruction set architecture. When the decode determines which execution unit is supposed to execute a particular instruction, it stores the execution unit identifier in the unit number queue 160a. Each execution unit executes instructions that it receives in order. As an example,consider four instructions 1, 2, 3, and 4. Instructions 1 and 3 are assigned to execution unit 5, instruction 2 is assigned to execution unit 4, and instruction 4 is assigned execution unit 1. The unit number queue stores, in order, 1, 5, 4, 5. The value of 5 is the front of the unit number queue, and 1 is the last inserted value in the unit number queue.

The write-back unit 150 reads the front of the queue—the value 5—and determines that the next instruction is the instruction execution unit number 5 is executing. The instruction, being executed by execution unit 5 is 1, which is the first instruction. Next, the write-back reads the value 4 from the unit number queue. The next instruction is the one being executed by execution unit 4, namely instruction 2, and so forth.

The program counter values corresponding to the instructions stored in the unit number queue 160a can be obtained from the epc queue 160b.

Therefore, the write-back 150 can determine the program counter value for each instruction it processes by means of the epc queue.

Each execution determines whether or not an instruction it is executing raised an exception. Once the write-back determines which execution unit has the next instruction, it reads the exception condition of that instruction from the execution unit.

The system therefore can determine, in program order, which instructions raised exceptions. As an optimization of this strategy, it might be known that certain execution units never cause exceptions. For instance, in FIG. 1, the execution unit shifter can never cause an exception. In that case, the write-back does not read the exception condition from the execution unit; it knows that no exception could occur.

When an execution unit finishes executing an instruction, it attempts to write the result of the execution to the register file 110 or to other parts of the processor such as the memory, special purpose registers, etc. This write is controlled by the write-back 150. Since the write-back can reconstruct the original program order using the unit number queue 160a, it can determine whether or not an instruction is permitted to modify the state of the processor. In addition to the execution unit number, the unit number queue 160a also stores information about where the state change on the processor for that instruction would take place—such as the register file 110, data memory, special purpose registers, etc. Given this information, the write-back 150 sends control information to the appropriate part of the processor, thus either permitting or inhibiting the state change. This control information is sent to the appropriate destination on the processor in program order. By this mechanism, the write-back 150 effectively orders state changes that occur in the processor.

When an exception is detected, it must be correctly handled by the write-back 150. All instructions that follow the exception-causing instruction must not be permitted to modify the state of the processor until the exception handler begins execution. From the type of instruction that was executed and from information computed in the execution unit, the write-back can determine the cause of the exception. The program counter of the exception-causing instruction can be obtained from the epc queue 160b. This information is stored in a special queue of size one.

The write-back 150 must also notify the pcunit 102 to begin executing instructions from the exception handler. According to the present invention, this notification is carried out using a special arbiter process.

The pcunit 102 continuously operates as follows. It computes the next program counter, followed by sending this program counter to the fetch 104. This program counter is tagged with a valid-again bit, set to false. After this program counter is sent, it checks to see if an exception was reported by the write-back. If there is no exception, the pcunit resumes computing the next program counter and repeats. Otherwise, the pcunit sends a program counter value tagged with a valid-again bit set to true, changes the next program counter value to the exception handler address, and resumes sending program counter values as usual.

The mechanism by which the pcunit 102 checks to see if an exception is reported by the write-back is implemented using an arbiter process. Arbiters are not used for such a purpose in clocked processors because an arbiter can take an arbitrary time to make a decision; in a clocked processor, the amount of time available for this decision is bounded by an integer number of clock periods, leading to a non-zero probability of failure when such a device is used. An asynchronous system will wait for the decision to be made, and therefore does not suffer from this problem. One aspect of the present invention is the recognition that arbiters can be used in asynchronous processors to handle exceptions since the asynchronous operation of the processor can wait for as long as it is necessary for the arbiter to make a decision.

Figure 2A:
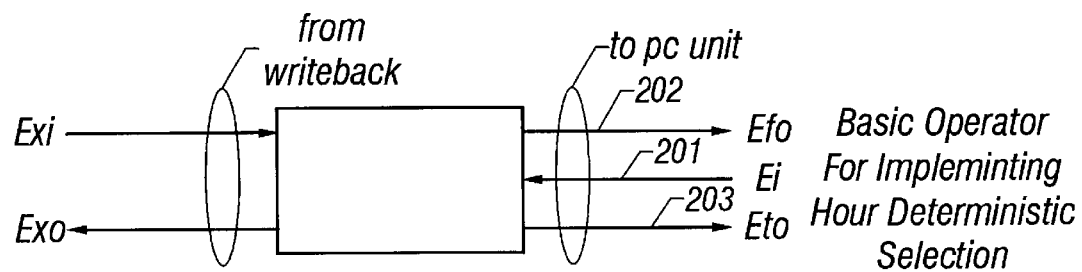
FIG. 2 shows the arbiter and acknowledge circuit.
Figure 2B:
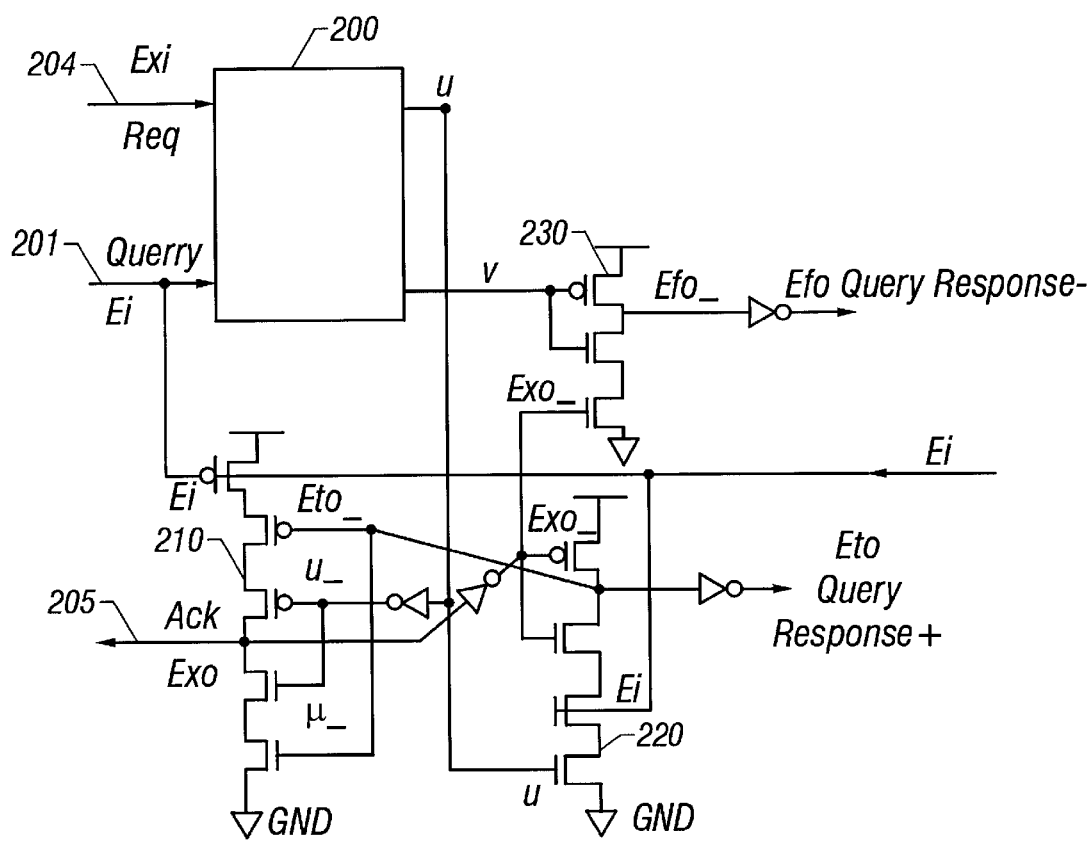

The description of the circuit used to check if there is a pending exception is shown in FIGS. 2A and 2B. FIG. 2A shows the basic operator for implementing the deterministic selection.

FIG. 2B shows a detailed diagram.

Block 200 is a standard arbitration device, and is well known to those having ordinary skill in the art.

The communication channel from the write-back unit to the pcunit is encoded using wires 204 and 205, where wire 204 is the request and 205 is the acknowledge rail for the communication channel. This channel uses a four phase asynchronous communication protocol. When there is a pending exception, request wire 204 is set to a high value. Once the exception condition is detected, the information toggles through the unit, to set acknowledge wire 205 to a high value. The pcunit responds to the acknowledge by setting request wire 204 to a low value, in response to which acknowledge wire 205 is set to a low value.

The pcunit can also poll the system for determining an exception. When the pcunit wants to know whether or not an exception value is pending, it sets query wire 201 to a high value. The circuit responds by setting query response positive wire 202 to a high value when it has detected an exception, or query response negative wire 203 when it has not detected an exception.

The pcunit responds by setting query wire 201 to a low value, after which the circuit sets both query response wire 202 and 203 to a low value. When query response positive wire 202 is set high to report an exception, acknowledge wire 205 is set to high as well to indicate that the exception was detected by the pcunit. This clears the exception condition, since the pcunit will respond to the acknowledge by sending request wire 204 to low.

In more detail, the standard arbiter circuit 200 is combined with auxiliary circuitry, including a number of switches, which collectively allow the operation in the exception mode. The arbiter includes two inputs: request and query. The outputs u and v of the arbiter represent the arbitration decision. The query is also attached to the input of switch 210. Other connections to switch 210 configured as a negative AND gate. The output u of the arbiter is inverted by inverter 212 to form signal u-, and its output is connected to another input of switch 210. Either the u- or the request, turns on the switch, producing output EX0, which is the acknowledge. EX0 is inverted to form EX0-.

EX0- is attached to the next switches 220 and 230, which respectively produce their respective query responses based on the states of u and v and the other inputs.

The exception condition is detected by the mean of an arbiter process. Hence, this condition might not be detected immediately but rather after an unknown number of additional program counter values are sent by the pcunit. During this period, the write-back must continue processing instructions. To permit this to occur, the communication channel 170 from the write-back 150 to the pcunit 102 must have at least one buffer slot so that the write-back does not wait for the pcunit 102 to detect the exception condition.

According to the present embodiment, when the pcunit 102 detects an exception, it sends out a program counter value that is tagged with a valid-again bit set to true. The fetch process 104 sends the instruction along with this valid-again bit to the decode process 108. This is passed through the decode 108 and sent to the part of the processor where the state change associated with saving the cause of the exception and modifications to other special registers must be made. When this decoded instruction is received by the various parts of the processor, the necessary state changes are made. This mechanism ensures that all instructions that were executed after the exception-causing instruction no longer use the state that is modified to store the cause of the exception, the program counter value, and other state modifications specified by the instruction set architecture. The cause of the exception and the program counter value are obtained from the special queue that the writeback back 150 stored them in.

When the write-back process 150 receives the instruction that has the valid-again bit set, it knows that the next instruction is the first instruction of the exception handler. Therefore, the write-back resumes its normal mode of operation by allowing the next and subsequent instruction to modify the state of the processor until the next exception is encountered.

This implementation of exception handling can be augmented to handle problems with sequencing conflicts that might occur when executing some instructions. In a synchronous processor, such conflicts can be handled by specifying "data hazards," because one can determine how long the sequencing conflict can last by counting the number of clock cycles before the conflict is eliminated. This is not possible in an asynchronous processor because there is no clock that guarantees that certain operations have completed. The exception mechanism presented here can be used to solve such sequencing problems. When an instruction that might cause a conflict is executed, it is reported as an exception by the write-back 150; the cause of the exception is the instruction itself. The write-back is modified so that, instead of permitting the pcunit to resume computing program counter values, it permits the pcunit to send the special valid-again tagged program counter value and then blocks the pcunit. When this valid-again instruction determines that the cause of the exception is the conflict-causing instruction, it executes that instruction. Since the pcunit is stalled by the write-back, no other instructions are dispatched after the conflict-causing instruction, thereby preventing any conflicts. Once the valid-again instruction reaches the write-back, it knows that the conflict causing instruction has completed execution and therefore it resumes the pcunit. The pcunit must now resume execution at the address following the conflict-causing instruction. This address is available from the write-back via the epc queue 160b.

The implementation of the exception mechanism also provides a way to prevent an instruction from modifying the state of the processor—via the write-back process 150. If the processor speculatively executes an instruction, the result of the instruction can be discarded by instructing the write-back unit to do so. Information about whether or not a speculative instruction should have been executed by the processor can be sent to the write-back unit via a queue, and the write-back can use this information to discard any modifications to the processor state caused by a speculatively executed instruction.

Although only a few embodiments have been described in detail above, other embodiments are contemplated by the inventor and are intended to be encompassed within the following claims. In addition, other modifications are contemplated and are also intended to be covered.

For example, the valid again bit can be implemented by any flag or other means of communication.

What is claimed is:

1. An asynchronous system, comprising:

a processor, which operates asynchronously, without common clock;

an exception handler, handling exceptions without synchronizing to a clock, said exception handler including an asynchronous circuit coupled between a program counter unit and a write-back unit of said processor to inform said write-back unit of an identity of an instruction associated with an exception and to communicate an exception handling command from said write-back unit to said program counter unit to handle said exception;

first and second signal wires coupled between said asynchronous circuit and said write-back unit, said first signal wire operable to send a request to said write-back unit in response to a command from said program counter unit and said second signal wire operable to send an acknowledgement from said write-back unit to said program counter unit;

a query signal wire coupled between said asynchronous circuit and said program counter unit and operable to transmit a query signal from said program counter unit as to whether an exception value is pending; and first and second query response signal wires coupled between said asynchronous circuit and said program counter unit to transmit responses to said query signal to said program counter unit.

2. The system as in claim 1, wherein said asynchronous circuit includes a queue to store a copy of program counter values produced by said program counter unit.

3. The system as in claim 1, wherein said asynchronous circuit includes a buffer in a communication channel from said write-back unit to said program counter unit to store at least one command from said write-back unit.

4. The system as in claim 1, wherein said exception handler further includes a queue between a decoder of said processor and said write-back unit to store execution identifiers uniquely associated with decoded instructions to be executed.

5. An asynchronous system, comprising:

a processor that operates asynchronously without a common clock, having a program counter unit, a fetch unit, a decoder, a register file unit, execution units, and a write-back unit to operate asynchronously relative to one another so that instructions are decoded and dispatched to allow simultaneous executions in said execution units;

a first queue coupled between said decoder and said write-back unit to store data to identify decoded instructions from said decoder;

a second queue coupled between said program counter unit and said write-back unit to store a copy of program counter values produced by said program counter unit; and an asynchronous communication channel with a buffer coupled between said write-back unit and said program counter unit to communicate an exception handling command issued by said write-back unit, wherein said write-back unit is operable to control exception operations in an asynchronous manner.

6. The system as in claim 5, wherein said write-back unit is operable to prevent updating of a state of said processor after an exception is raised and is being handled.

7. The system as in claim 5, wherein said communication channel includes two signal wires using an asynchronous protocol.

8. A method for handling an exception in an asynchronous system, comprising:

decoding and dispatching instructions in a pipeline manner, without a common clock;

asynchronously executing decoded instructions without a common clock;

keeping a record of program counter values of fetched instructions in a first queue;

keeping a record of assignments of said execution units for executing said decoded instructions in a second queue;

determining which instruction causes an exception by the program order from the record in the first queue and the record in the second queue;

preventing a state of said processor from being updated by said instruction that causes said exception based on the record from the second queue associated with said instruction;

executing a program to handle said exception; and continuing execution of remaining instructions after said exception is handled.

9. The method as in claim 8, wherein a sequencing conflict is represented by an exception, and further comprising:

stalling dispatching of subsequent instructions from a program counter unit after an instruction causes a sequencing conflict;

completing execution of said instruction that causes said sequencing conflict; and resuming dispatching, decoding, and executing of said subsequent instructions.

* * * * *